(12) United States Patent
Ogawa (10) Patent No.: US 8,459,583 B2
(45) Date of Patent: Jun. 11, 2013

(54) SEAT BELT RETRACTOR (75) Inventor: Kiyoshi Ogawa, Yokohama (JP)

(73) Assignee: Autoliv Development AB, Vargarda (SE)

( * ) Notice: Subject to any disclaimer, the term of this patent is extended or adjusted under 35 U.S.C. 154(b) by 337 days.

(21) Appl. No.: 12/922,839

(22) PCT Filed: Apr. 3, 2009

(86) PCT No.: PCT/JP2009/056992
§ 371 (c)(1),
(2), (4) Date: Sep. 15, 2010

(87) PCT Pub. No.: WO2009/123314
PCT Pub. Date: Oct. 8, 2009

(65) Prior Publication Data
US 2011/0011969 A1   Jan. 20, 2011

(30) Foreign Application Priority Data
Apr. 4, 2008   (JP) .................................. 2008-098493

(51) Int. Cl.
*B65H 75/48* (2006.01)
(52) U.S. Cl.
USPC ...................................................... 242/374
(58) Field of Classification Search
USPC ............................. 242/374, 375, 375.1–375.3
See application file for complete search history.

(56) References Cited

U.S. PATENT DOCUMENTS

| | | | | |
|---|---|---|---|---|
| 4,508,287 A | * | 4/1985 | Nilsson | 242/374 |
| 5,407,148 A | * | 4/1995 | Ono et al. | 242/374 |
| RE36,190 E | | 4/1999 | Ono et al. | |
| 6,732,968 B2 | * | 5/2004 | Yoon | 242/382.6 |
| 7,500,632 B2 | * | 3/2009 | Ono et al. | 242/374 |
| 2008/0012282 A1 | | 1/2008 | Odate et al. | |

FOREIGN PATENT DOCUMENTS

| | | | |
|---|---|---|---|
| JP | 4-50840 | | 6/1992 |
| JP | 2001138866 A | * | 5/2001 |
| JP | 2007-076636 A | | 3/2007 |
| WO | WO 2009/123314 | | 10/2009 |

OTHER PUBLICATIONS

International Search Report in International Application No. PCT/JP2009-056992, dated May 12, 2009, 2 pages.

* cited by examiner

*Primary Examiner* — Sang Kim
(74) *Attorney, Agent, or Firm* — Brinks Hofer Gilson & Lione (57) ABSTRACT

A seat belt retractor (10) is provided with: a spindle (12) around which a seat belt (B) is wound; a torsion bar (17) disposed in a cavity (27) of the spindle (12), an axial end portion of the torsion bar (17) being attached to an axial end portion of the spindle (12); a first pretensioner (16) that is attached to the spindle (12) at least during a collision so as to cause the spindle (12) to rotate in a retraction direction using a gas pressure; and a second pretensioner (18) that is attached to another axial end portion of the torsion bar (17) at least during a collision so as to cause the spindle (12) to rotate in the retraction direction via the torsion bar (17) using the gas pressure.

12 Claims, 8 Drawing Sheets

SEAT BELT RETRACTOR

This application is a National Stage of International Application No. PCT/JP2009/056992 filed on Apr. 3, 2009, which claims priority to Japanese Patent Application No. JP 2008-098493 filed with the Japanese Patent Office on Apr. 4, 2008, the entirety of which are hereby incorporated by reference.

TECHNICAL FIELD

The present invention relates to a seat belt retractor, and more particularly to a seat belt retractor having a pretensioner that is activated during a vehicle collision.

BACKGROUND ART

Recent seat belt retractors are provided with a pretensioner that drives a spindle to retract during a vehicle collision using gas pressure generated by exploding an explosive. Further, a retractor that includes a pair of pretensioners in order to increase a restraining force and a restraint amount of a seat belt without increasing the amount of explosive has been proposed (see Patent Document 1, for example). In this retractor, the pair of pretensioners, which are disposed on one side of a spindle, are activated simultaneously at the time of a vehicle collision and thereby joined to the spindle, whereupon the spindle is driven to retract.

Further, in a proposed retractor having a force limiter mechanism, in which energy is absorbed by causing a torsion bar to twist such that a seat belt is unreeled when a load of at least a set value acts on the seat belt during a vehicle collision, a pretensioner drives a spindle to retract via the torsion bar (see Patent Document 2, for example). According to this retractor, the restraining force generated by the pretensioner is transmitted to the spindle via the torsion bar, and therefore, when the spindle is rotated in an unreeling direction by activating the force limiter mechanism after driving the pretensioner, the operation of the pretensioner is not affected by this rotation.

Patent Document 1: Japanese Utility Model Laid-open No. H6-6131

Patent Document 2: Japanese Patent Application Laid-open No. H10-1025

Incidentally, in the seat belt retractor described in Patent Document 1, no mention is made of a force limiter mechanism. Therefore, in a case where this seat belt retractor is used together with a force limiter mechanism, gas pressure remaining in the pair of pretensioners may affect an operation of the force limiter mechanism when the force limiter mechanism is activated after the pretensioners drive the spindle to retract.

Further, in the seat belt retractor described in Patent Document 2, when an energy absorption load is smaller than a retraction load generated by the pretensioner, the torsion bar is twisted by the retraction load of the pretensioner, and as a result, the belt cannot be retracted sufficiently.

DISCLOSURE OF THE INVENTION

The present invention has been designed in consideration of the circumstances described above, and an object thereof is to provide a seat belt retractor with which energy absorption can be performed appropriately by a force limiter mechanism and an improvement can be achieved in a retraction performance of a pretensioner.

The aforesaid object of the present invention is achieved by the following embodiments.

(1) A seat belt retractor including:
a spindle around which a seat belt is wound;
a torsion bar disposed in a cavity of the spindle, an axial end portion of the torsion bar being joined to an axial end portion of the spindle;
a first pretensioner that is joined to the spindle at least during a collision so as to cause the spindle to rotate in a retraction direction using a gas pressure; and
a second pretensioner that is joined to another axial end portion of the torsion bar at least during a collision so as to cause the spindle to rotate in the retraction direction via the torsion bar using the gas pressure.

(2) The seat belt retractor described in (1), wherein the second pretensioner is set to be activated after an operation of the first pretensioner begins.

(3) The seat belt retractor described in (2), wherein an activation interval between the first pretensioner and the second pretensioner is varied in accordance with a collision speed.

(4) The seat belt retractor described in (1), wherein, when a collision speed exceeds a first predetermined speed, the first pretensioner and the second pretensioner are activated at a first activation interval,
when the collision speed is no higher than the first predetermined speed and no lower than a second predetermined speed, the first pretensioner and the second pretensioner are activated at a second activation interval that is longer than the first activation interval, and
when the collision speed is lower than the second predetermined speed, the first pretensioner is activated.

(5) The seat belt retractor described in (4), wherein the second pretensioner is activated in a case where a double collision occurs at a collision speed no lower than a third predetermined speed following activation of the first pretensioner due to a collision occurring at a lower collision speed than the second speed.

(6) The seat belt retractor described in any of (1) to (5), wherein the first pretensioner stops retracting the spindle once the seat belt has been retracted by a predetermined amount.

(7) The seat belt retractor described in any of (1) to (6), wherein at least one of the first pretensioner and the second pretensioner includes a drive member that is driven in a predetermined direction by the gas pressure in order to rotate the spindle in the retraction direction, and a restricting mechanism that restricts movement of the drive member in an opposite direction to the predetermined direction.

(8) The seat belt retractor described in any of (1) to (7), wherein the first pretensioner is constituted by a rack and a pinion, and includes a pressure receiving surface for receiving the gas pressure from a gas that is generated by exploding an explosive and a discharge port for discharging the generated gas.

With the seat belt retractor according to the present invention, the first pretensioner uses the gas pressure to rotate the spindle in the retraction direction during a vehicle collision, whereupon the second pretensioner uses the gas pressure to rotate the spindle in the retraction direction via the torsion bar. As a result, looseness can be eliminated from the seat belt such that an occupant can be firmly restrained in his/her seat. When an unreeling direction load acts on a seat belt due to an inertial movement of the occupant during the vehicle collision, the torsion bar twists, and as a result, the seat belt can be unreeled, thereby lightening a load on the chest portion of the occupant. Hence, energy absorption can be performed appropriately by the torsion bar and an improvement in a retraction performance can be achieved by increasing a power and an amount of retraction during emergency retraction by the first pretensioner and the second pretensioner. Thus, people having weak bones, in particular the elderly, can be restrained appropriately while suppressing bodily damage thereto.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

EXPLANATION OF REFERENCE NUMERALS

| | |
|---|---|
| 10, 70 | seat belt retractor |
| 12 | spindle |
| 16, 71 | first pretensioner |
| 17 | torsion bar (force limiter mechanism) |
| 18 | second pretensioner |
| 27 | cavity |
| 43 | drive ball (drive member) |
| 77 | rack (drive member) |
| 78 | pawl member (restricting mechanism) |
| 79 | biasing spring (restricting mechanism) |
| 87 | pressure receiving surface |
| 93 | discharge port |
| B | seat belt |

BEST MODES FOR CARRYING OUT THE INVENTION

A seat belt according to respective embodiments of the present invention will be described in detail below with reference to the drawings.
(First Embodiment)

Figure 1:
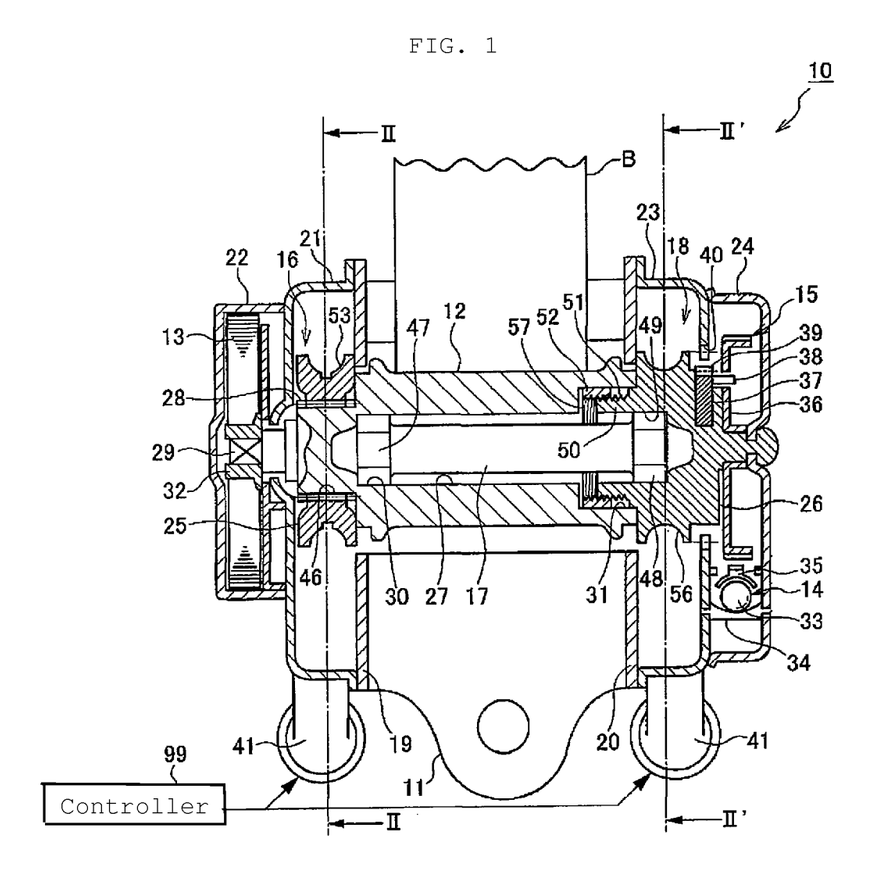
FIG. 1 is a longitudinal sectional view of a seat belt retractor according to a first embodiment of the present invention.

As shown in FIG. 1, a seat belt retractor 10 according to a first embodiment of the present invention includes a spindle 12 supported rotatably on a retractor frame 11 to retract a seat belt B, a retraction spring 13 that biases the spindle 12 in a retraction direction of the seat belt B, an acceleration sensor 14 that detects acceleration of a vehicle in the horizontal direction, a lock mechanism 15 that locks an unreeling operation of the seat belt B in accordance with the acceleration detected by the acceleration sensor 14, a first pretensioner 16 joined to the spindle 12, a torsion bar 17 serving as a force limiter mechanism for unreeling the seat belt B while absorbing energy when a load that is equal to or greater than a set load acts on the seat belt B, and a second pretensioner 18 that is joined to the torsion bar 17. A ball-and-pinion system is applied to both the first and the second pretensioners 16, 18.

The retractor frame 11 is made of metal and constituted by a first side plate 19 positioned on the left side of FIG. 1 and a second side plate 20 positioned on the right side. Thus, this frame has a substantially U-shaped form. A pretensioner cover 21 and a retraction spring cover 22 are attached to the first side plate 19, while a drive cover 23 and a system cover 24 are attached to the second side plate 20.

A closed-end cavity 27 is provided in a central portion of the spindle 12, while a spline fitting portion 28 and a non-circular retraction spring joining portion 29 that projects from the spline fitting portion 28 are formed on a left end portion of the spindle 12 in FIG. 1. Further, an engaged portion 30 of the non-circular torsion bar 17 is formed on a closed end portion side of the cavity 27 of the spindle 12 and a movable stopper hole portion 31 is formed on an open portion side of the cavity 27.

The retraction spring 13 is housed in the retraction spring cover 22 such that an inner peripheral end portion thereof is fixed to the retraction spring joining portion 29 of the spindle 12 via a latch member 32 and an outer peripheral end portion thereof is fixed to the retraction spring cover 22. Thus, the retraction spring 13 biases the spindle 13 in the retraction direction.

The acceleration sensor 14 includes a sensor weight 33, a sensor case 34 housing the sensor weight 33, and a sensor lever 35 attached to the sensor case 34 to be free to rock.

Figure 3A:
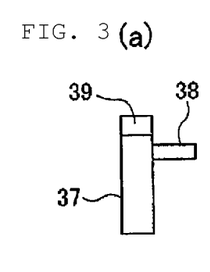
FIG. 3A is a front view of a lock dog shown in FIG. 1.
Figure 3B:
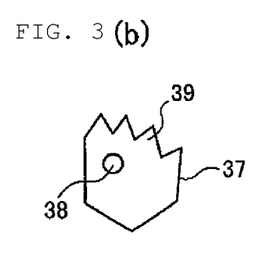
FIG. 3B is a side view of the lock dog of FIG. 3A.

Various well-known embodiments may be employed in the lock mechanism 15. In this embodiment, the lock mechanism 15 includes a bearing plate, an inertial body, a WS lever, and a spring, none of which are shown in the drawings, and also includes a steering disk 36 and a lock dog 37. The lock dog 37, as shown in FIG. 3, has a substantially fan-shaped form with tooth portions 39 provided on an outer peripheral portion and a projecting pin 38 provided on a side portion thereof.

When the horizontal direction acceleration detected by the acceleration sensor 14 is larger than a predetermined value during a vehicle collision or the like, the sensor weight 33 moves, causing the sensor lever 35 to rotate upward, and as a result, the sensor lever 35 engages with the steering disk 36.

When the seat belt B is unreeled from the seat belt retractor 10 in a state where rotation of the steering disk 36 in the unreeling direction is prevented, a rotation delay is generated in the steering disk 36 relative to the spindle 12. Accordingly, the pin 38 of the lock dog 37, which is attached rotatably to a second pinion 26 to be described below, is moved radially outward by the relative rotation between the spindle 10 and the steering disk 36 such that the tooth portions 39 of the lock dog 37 engage with engagement internal teeth 40 formed on the drive cover 23, and as a result, an unreeling operation of the spindle 12 for unreeling the seat belt B is locked.

A first engagement portion 47 that engages with the engaged portion 30 of the spindle 12 is provided in one axial end portion of the torsion bar 17, and a second engagement portion 48 that engages with an engaged portion 49 formed on an inner peripheral surface of the second pinion 26, to be described below, is provided in another axial end portion of the torsion bar 17. The torsion bar 17 is formed from a member that is capable of plastic deformation, and is designed to have sufficient thickness and hardness to generate a greater twisting torque than a torque generated by an operation of the second pretensioner 18. Hence, when a load that is equal to or greater than a set load acts on the seat belt B such that the spindle 12 attempts to rotate in the unreeling direction of the seat belt B, the torsion bar 17 absorbs energy by twisting, and as a result, the seat belt B is unreeled.

The first pretensioner 16 is incorporated into the pretensioner cover 21 of the retractor frame 11, and includes a first pinion 25, a tube pipe 41, a resin piston ball 42, a plurality of metal drive balls 43 serving as drive members, a ball stop spring 44, and a gas generator (MGG) 45.

As shown in FIGS. 1 and 2A, a plurality of hemispherical pockets 53 for accommodating the drive balls 43 are provided in a circumferential direction in an outer peripheral portion of the first pinion 25. Further, a spline fitted portion 46 that is fitted to the spline fitting portion 28 of the spindle 12 is formed in an inner peripheral portion of the first pinion 25 such that the first pinion 25 is joined to the spindle 12 at all times.

The tube pipe 41 is a pressure vessel member that guides the drive balls 43 and maintains a combustion pressure generated by the gas generator 45. The gas generator 45 is incorporated into a base end side of the interior of the tube pipe 41 and electrically connected to an MGG connector, not shown in the drawings, and a control circuit (also referred to as a controller hereafter) 99. A ball stopper 55 constituted by a resin clip is fitted into a hole formed in a tip end side of the tube pipe 41.

When the gas generator 45 is ignited via the MGG connector, thereby exploding an explosive such that gas is generated, resultant gas pressure causes the drive balls 43 to shear the ball stopper 55 via the piston ball 42, and as a result, the drive balls 43 that have been pushed out of the tube pipe 41 enter the pockets 53 in the first pinion 25 so as to mesh with the first pinion 25, whereby the first pinion 25 is caused to rotate. Hence, the first pinion 25 converts the movement of the drive balls 43 into a rotating motion. Note that in a normal condition, the ball stop spring 44 prevents noise caused by rattling of the drive balls 43.

The second pretensioner 18 is housed in the drive cover 23 of the retractor frame 11 and includes, in addition to the second pinion 26, the tube pipe 41, the resin piston ball 42, the metal drive balls 43 serving as drive members, the ball stop spring 44, and the gas generator (MGG) 45, similarly to the first pretensioner 16.

As shown in FIGS. 1 and 2B, a plurality of hemispherical pockets 56 for accommodating the drive balls 43 are provided in a circumferential direction in an outer peripheral portion of the second pinion 26, and the engaged portion 49 that engages with the second engagement portion 48 of the torsion bar 17 is formed on an inner peripheral surface of the second pinion 26. Further, the second pinion 26 is formed with a tube portion 50 disposed in an inner peripheral portion of the stopper moving hole portion 31 formed in the spindle 12. A male screw portion 51 is formed on an outer peripheral portion of the tube portion 50, and a stopper 52 is screwed to the male screw portion 51.

Figure 4:
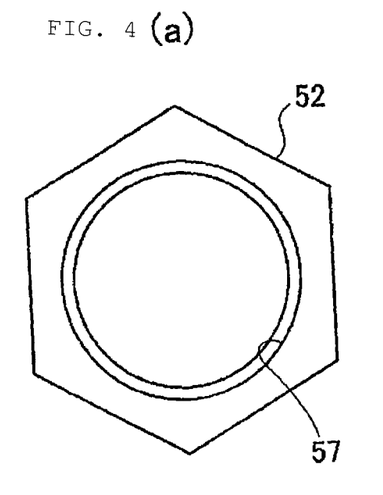
FIG. 4A is a side view of a stopper shown in FIG. 1.
FIG. 4B is a sectional view of the stopper of FIG. 4A.

As shown in FIG. 4, the stopper 52 has an identical outer shape (in this embodiment, a perfect hexagon) to the stopper moving hole portion 31 of the spindle 12. However, this stopper has a slightly smaller outer dimension than the stopper moving hole portion 31, and a female screw portion 57 is formed in an inner peripheral portion thereof. When the torsion bar 17 twists such that the spindle 10* and the second pinion 26 rotate relative to each other, the stopper 52 is permitted to slide within the hole portion 31 of the stopper 52 up to an end portion of the male screw portion 51 while becoming screwed to the male screw portion 51.

Figure 2:
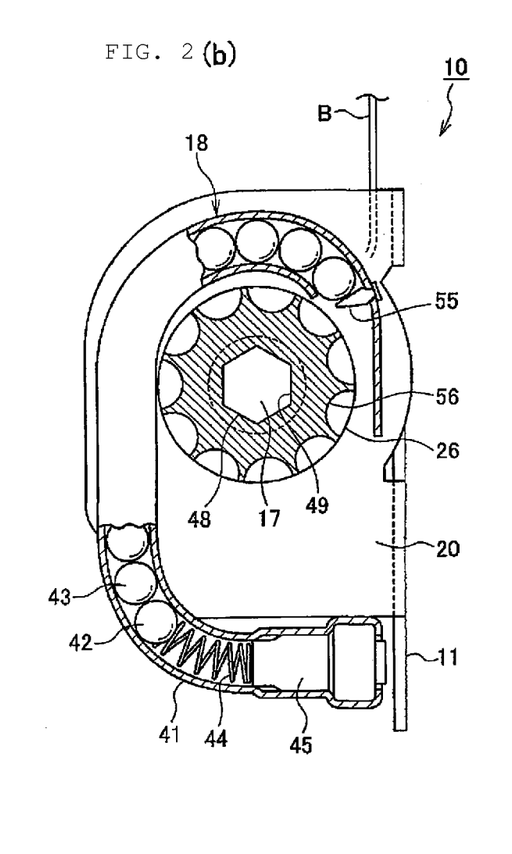
FIG. 2A is a partially cut away side view of the periphery of a first pretensioner shown in FIG. 1, taken along a II-II line in FIG. 1.
FIG. 2B is a partially cut away side view of the periphery of a second pretensioner shown in FIG. 1, taken along a II'-II' line in FIG. 1.

Next, referring to FIGS. 1, 2 and 5, an operation of the seat belt retractor 10 will be described.

In a normal condition, the respective components constituting the first pretensioner 16 and the second pretensioner 18 are inoperative and fulfill no functions other than to support the spindle 12 and apply a biasing force generated by the retraction spring 13. Further, the drive balls 43 provided in the tube pipe 41 of each pretensioner 16, 18 are held in the tube pipe 41 by the ball stopper 55 and do not therefore drive the first pinion 25 and the second pinion 26.

In this case, when an occupant or the like unreels the seat belt B such that the seat belt B wound around the spindle 12 is unreeled, the spindle 12 rotates. The spindle 12 rotates freely, thereby causing a retraction force to act upon and retract the retraction spring 13. When the occupant or the like stops unreeling the seat belt B by relaxing his/her grip, the spindle 12 is rotated in reverse by the reaction force of the retraction spring 13, whereby the seat belt B is wound onto the spindle 12.

During emergency braking or the like, in which a smaller shock than that of a vehicle collision is generated, the first and second pretensioners 16, 18 are not activated, and instead, unreeling of the seat belt B is prevented by the lock mechanism 15.

Figure 5:
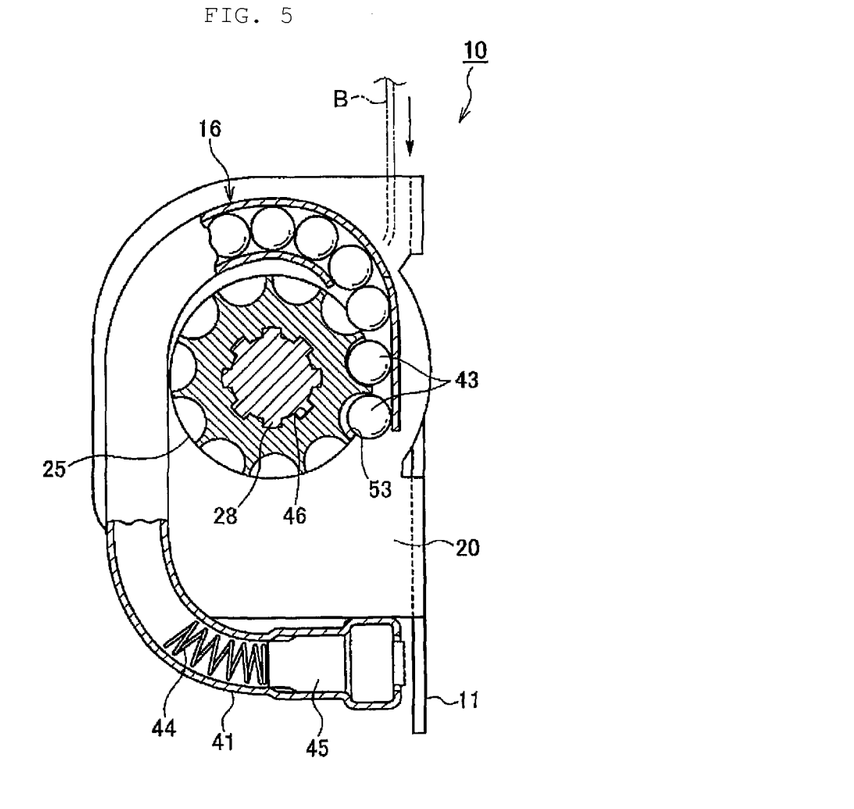
FIG. 5 is a view illustrating an operation of the seat belt retractor shown in FIG. 1.

As shown in FIG. 5, when the control circuit 99 generates a shock signal during a vehicle collision or the like, a current for activating ignition of the gas generator 45 in the first pretensioner 16 is caused to flow. As a result, the gas generator 45 is ignited such that high-pressure gas is ejected.

The high-pressure gas is held by the gas generator 45, the tube pipe 41, and the piston ball 42 until eventually, only the piston ball 42 can move. Accordingly, the gas pressure causes the piston ball 42 to move toward the tip end side of the tube pipe 41, whereby the drive ball 43 that contacts the piston ball 42 is pushed by the piston ball 42 and thereby driven to move to the tip end open side of the tube pipe 41.

The plurality of drive balls 43 are packed into the tube pipe 41 without gaps and therefore constitute a ball chain. Hence, the motion of the drive ball 43 is transmitted to all of the drive balls 43, and as a result, the drive balls 43 are pushed out and shear off the ball stopper 55 provided on the tip end open side of the tube pipe 41 from the base.

The drive balls 43 then mesh with the pockets 53 in the first pinion 25, whereby the first pinion 25 is caused to begin to rotate in a clockwise rotation direction of FIG. 5 by the pushing motion of the drive balls 43. Accordingly, the spindle 12 is rotated in the retraction direction and the seat belt B is retracted.

Once the operation of the first pretensioner 16 has begun, a current for activating ignition of the gas generator 45 in the second pretensioner 18 is caused to flow from the control circuit 99 via the MGG connector. Similarly to the first pretensioner 16, an explosive is exploded when the gas generator 45 is ignited such that high-pressure gas is ejected, and as a result, the drive balls 43 mesh with the pockets 56 in the second pinion 26 such that the second pinion 26 rotates the spindle 12 in the retraction direction via the torsion bar 17. Thus, the seat belt B is retracted.

When all of the drive balls 43 have finished meshing with the pockets 53 in the first pinion 25, the first pretensioner 16 is separated from the pockets 53, and therefore retraction of the seat belt B is terminated. Hence, when the operation of the first pretensioner 16 is complete, the retraction force generated by the drive balls 43 no longer acts on the first pinion 25, and as a result, a subsequent operation of the force limiter mechanism is not affected.

Note that in this embodiment, activation of the second pretensioner 18 begins after the first pretensioner 16 has started to rotate. Further, retraction of the seat belt B is set such that when the first pinion 25 rotates, the seat belt B is initially retracted by a load of a certain magnitude, and when the second pinion 26 rotates thereafter, the seat belt B is retracted while continuing to apply the load generated by the first pretensioner 16. Hence, the occupant is firmly restrained in his/her seat by the seat belt B.

Meanwhile, when a load is applied in the unreeling direction of the seat belt B due to an inertial movement of the occupant accompanying the vehicle collision, the seat belt B starts to unreel. When the seat belt B unreels in this case, the spindle 12 begins to rotate in the unreeling direction of the seat belt B.

At this time, rotation of the second pinion 26 is restrained by the lock mechanism 15, and therefore the torsion bar 17 begins to twist due to the rotation of the spindle 12 in the unreeling direction. Accordingly, the torsion bar 17 deforms plastically so as to unreel the seat belt B while absorbing energy, and as a result, a load on a chest portion of the occupant can be lightened.

Further, when the torsion bar 17 begins to twist in accordance with rotation of the spindle 12, the stopper 52 begins to slide through the stopper moving hole portion 31 in a rightward direction of FIG. 1 while the female screw portion 57 thereof screws onto the male screw portion 51 of the tube portion 50 in the second pinion 26.

When the stopper 52 contacts the end portion of the male screw portion 51 in the tube portion 50 of the second pinion 26, screwing stops. Thus, the unreeling amount of the seat belt B is limited.

As shown in Table 1, the controlling portion 99 transmits a shock signal to the second pretensioner 18 to vary an activation interval of the second pretensioner 18 following the start of an operation of the first pretensioner 16, or to indicate whether or not the second pretensioner 18 is to be activated, in accordance with a collision speed and a collision form.

Figure 6A:
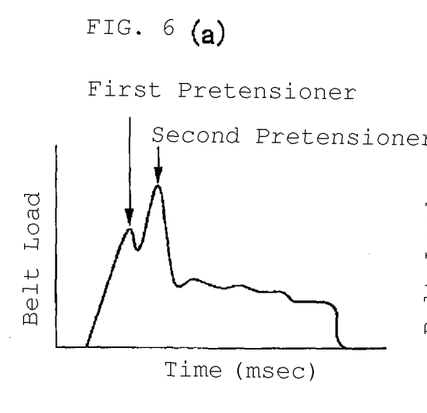
FIG. 6 is a graph showing belt loads generated when the respective pretensioners are activated in accordance with a collision speed and a collision form.
Figure 6B:
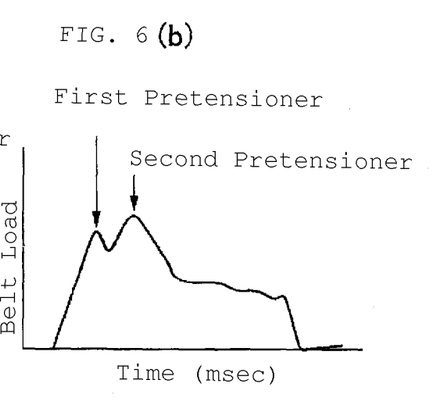
Figure 6C:
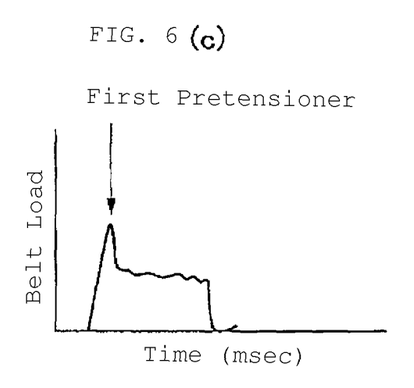

More specifically, when the collision speed exceeds a first predetermined speed (in this embodiment, 70 km/h) during a front collision or an offset collision, the first pretensioner 16 and the second pretensioner 18 are activated at a first activation interval (in this embodiment, 4 msec) such that a large belt load is obtained upon activation of the second pretensioner (see FIG. 6A). Further, when the collision speed is no higher than the first predetermined speed and no lower than a second predetermined speed (in this embodiment, 40 km/h), the first pretensioner and the second pretensioner are activated at a second activation interval (in this embodiment, 7 msec) that is longer than the first activation interval, whereby a belt load shown in FIG. 6B is obtained. Furthermore, when the collision speed is lower than the second predetermined speed, only the first pretensioner 16 is activated, whereby a belt load shown in FIG. 6C is obtained.

Figure 6D:
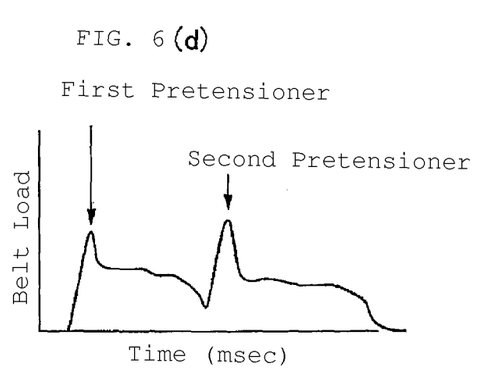

Further, in a case where a double collision occurs at a collision speed no lower than a third predetermined speed (in this embodiment, 50 km/h) following activation of the first pretensioner 16 due to a collision having a lower collision speed than the second speed, the second pretensioner 18 is activated (see FIG. 6D). Looseness in the seat belt B can thus be eliminated when a double collision occurs.

Furthermore, only the first pretensioner 16 is activated during a side collision.

As described above, with the seat belt retractor 10 according to the first embodiment, during a vehicle collision the first pretensioner 16 uses gas pressure to cause the spindle 12 to rotate in the retraction direction and the second pretensioner 18 uses gas pressure to cause the spindle 12 to rotate in the retraction direction via the torsion bar 17. As a result, looseness can be eliminated from the seat belt B and the occupant can be firmly restrained in his/her seat. When an unreeling direction load acts on the seat belt B due to an inertial movement of the occupant accompanying the vehicle collision, the torsion bar 17 constituting the force limiter mechanism twists, and as a result, the seat belt B can be unreeled, thereby lightening a load on the chest portion of the occupant. Hence, energy absorption can be performed appropriately by the torsion bar 17 and an improvement can be achieved in the retraction performance of the first pretensioner 16 and second pretensioner 18.

TABLE 1

| | COLLISION FORM | | | | | |
|---|---|---|---|---|---|---|
| | FRONT COLLISION, OFFSET COLLISION | | | DOUBLE COLLISION | | SIDE COLLISION |
| | COLLISION SPEED | | | | | |
| | HIGH-SPEED COLLISION, COLLISION AT 70 km/h HIGH SPEED LEVEL | HIGH-SPEED COLLISION, COLLISION AT 50 km/h HIGH SPEED LEVEL | MEDIUM-SPEED COLLISION, COLLISION AT 30 km/h HIGH SPEED LEVEL | MEDIUM-SPEED COLLISION, COLLISION AT 30 km/h HIGH SPEED LEVEL | HIGH-SPEED COLLISION, COLLISION AT 50 km/h HIGH SPEED LEVEL | |
| FIRST PRETENSIONER ACTIVATED? | YES | YES | YES | YES | | YES |
| SECOND PRETENSIONER ACTIVATED? | YES | YES | | | YES | |
| ACTIVATION INTERVAL | 4 msec | 7 msec | | VARY IN ACCORDANCE WITH TIME INTERVAL OF DOUBLE COLLISION | | |

Further, with the seat belt retractor 10 according to the first embodiment, the second pretensioner 18 is activated after an operation of the first pretensioner 16 has begun, and therefore a large load can be applied to the seat belt B by the first pretensioner 16 to begin retraction of the seat belt B, whereupon the second pretensioner 18 can be activated to retract the seat belt B while continuing to apply the load generated by the first pretensioner 16.

Furthermore, once the first pretensioner 16 has performed an operation to retract the seat belt B by a predetermined amount, retraction of the spindle 12 is terminated, and therefore an operation of the force limiter mechanism is not affected.

Moreover, the activation interval between the first pretensioner 16 and the second pretensioner 18 is varied in accordance with the collision speed, and therefore looseness in the seat belt B can be eliminated by applying a belt load that corresponds to the collision speed.

In addition, when the collision speed exceeds the first predetermined speed, the first pretensioner 16 and second pretensioner 18 are activated at the first activation interval, and when the collision speed is no higher than the first predetermined speed and no lower than the second predetermined speed, the first pretensioner 16 and second pretensioner 18 are activated at the second activation interval, which is longer than the first activation interval. Moreover, when the collision speed is lower than the second predetermined speed, only the first pretensioner 16 is activated. Hence, a larger number of belt loads can be set in accordance with the collision speed.

Further, in a case where a double collision occurs at a collision speed no lower than the third predetermined speed following activation of the first pretensioner due to a collision having a lower collision speed than the second speed, the second pretensioner 18 is activated, and therefore looseness in the seat belt B can be eliminated similarly when a double collision occurs.

(Second Embodiment)

Next, referring to FIGS. 7 and 8, a seat belt retractor according to a second embodiment of the present invention will be described. Note that identical parts to the first embodiment described above have been allocated identical or corresponding reference symbols in the drawings and description thereof has been omitted.

Figure 7:
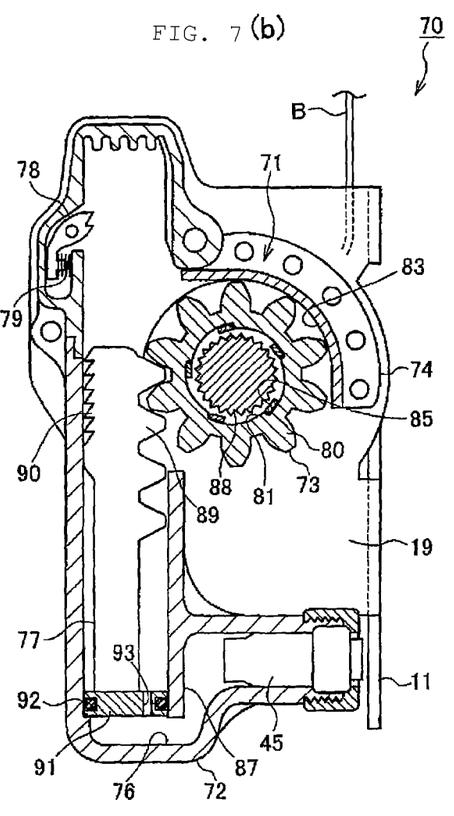
FIG. 7A is a longitudinal sectional view of a seat belt retractor according to a second embodiment of the present invention.
FIG. 7B is a partially cut away side view of the periphery of a first pretensioner shown in FIG. 7A, taken along a VII-VII line.

As shown in FIG. 7, in a seat belt retractor 70 according to this embodiment, a rack-and-pinion system is applied to a first pretensioner 71. The first pretensioner 71 includes a die-cast metal manifold case 72 attached to the pretensioner cover 21, a first pinion 73, a pinion guide 74, a clutch plate 75, a rack 77 serving as a drive member, a pawl member 78 and a biasing spring 79 serving as a restricting mechanism, and the gas generator 45.

Tooth portions 80 are provided in an outer peripheral portion of the first pinion 73 and a plurality of cam grooves 81 (five in this embodiment) are formed in an inner peripheral portion thereof. The pinion guide 74 takes a curved shape so as to surround the first pinion 73 partially, and a guide surface 83 for guiding and supporting the outer periphery of the first pinion 73 is provided on an inner side thereof.

The clutch plate 75 includes a circular plate-shaped main body portion 84, a plurality of arm portions 85 and power transmission pieces 86 projecting from the main body portion 84 toward the spindle 12, and a plurality of projections 87 projecting from the main body portion 84 toward an opposite side to the arm portions 85 and power transmission pieces 86. The main body portion 84 is fixed non-rotationally by inserting the projections 87 into the pretensioner cover 21.

The power transmission pieces 86 are normally housed in a deep groove part of the cam grooves 81 in the first pinion 73 between the cam grooves 81 of the first pinion 73 and a serrated shaft portion 88 of the spindle 12 so as not to contact the serrated shaft portion 88 of the spindle 12. On the other hand, when the first pinion 73 is rotated by the rack 77, the power transmission pieces 86 move to a shallow groove part of the cam grooves 81 as the first pinion 73 rotates, whereby the power transmission pieces 86 become sandwiched between the cam grooves 81 and the serrated shaft portion 88. The arm portions 85 are then broken, whereupon the power transmission pieces 86 continue to rotate together with the first pinion 73 and the spindle 12.

The manifold case 72 is formed with an L-shaped gas flow passage 76, the gas generator 45 being incorporated into a base end portion of the gas flow passage 76. A pressure receiving surface 87 for receiving gas pressure is formed in a part of the manifold case 72 opposing the gas generator 45.

Tooth portions 89 capable of meshing with the tooth portions 80 of the first pinion 73 are provided on a tip end portion side of the rack 77, and notch portions 90 are provided on an opposite side of the tip end portion side to the tooth portions 89. Further, the number of the tooth portions 89 provided on the rack 77 is set such that the tooth portions 89 do not engage with the tooth portions 80 of the first pinion 73 after the pretensioner 71 is activated. A base end portion 91 of the rack 77 is formed with a diameter that is identical to an inner diameter of the gas flow passage 76. An O ring 92 is fitted onto an outer periphery of the base end portion 91, and a discharge port 93 having a diameter of approximately 1 mm is formed in a thickness direction of the base end portion 91. The discharge port 93 connects a space on the gas generator side of the gas flow passage 76 to a space on the first pinion 73 side.

The biasing spring 79 supports the pawl member 78 to be capable of rocking while biasing the pawl member 78 such that a tip end portion thereof always projects into a movement path of the rack 77 through the manifold case 72. Hence, when the rack 77 moves such that the pawl member 78 is latched to the notch portions 90 of the rack 77, the pawl member 78 restricts movement of the rack 77 in an opposite direction to a movement direction.

Next, referring to FIGS. 7 and 8, an operation of the seat belt retractor 70 will be described. Note that in the description of this embodiment also, a case in which the second pretensioner 18 is activated after beginning an operation of the first pretensioner 71 will be described.

Normally, the power transmission pieces 86 of the clutch plate 75 in the first pretensioner 71 are disposed in the deep groove part of the cam grooves 81 provided in the first pinion 73, and therefore the power transmission pieces 86 do not contact the serrated shaft portion 88 of the spindle 12. Hence, the first pinion 73 and the spindle 12 are capable of relative rotation.

Figure 8:
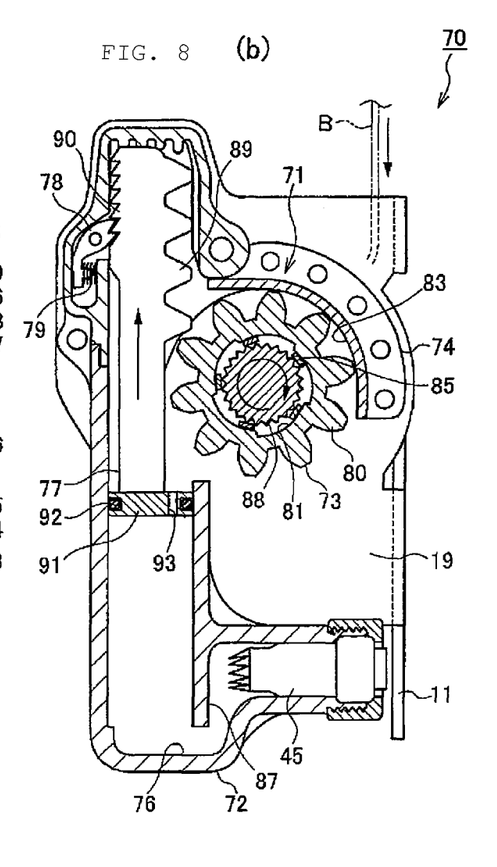
FIGS. 8A and 8B are views illustrating an operation of the seat belt retractor shown in FIG. 7A.
Figure 8A:
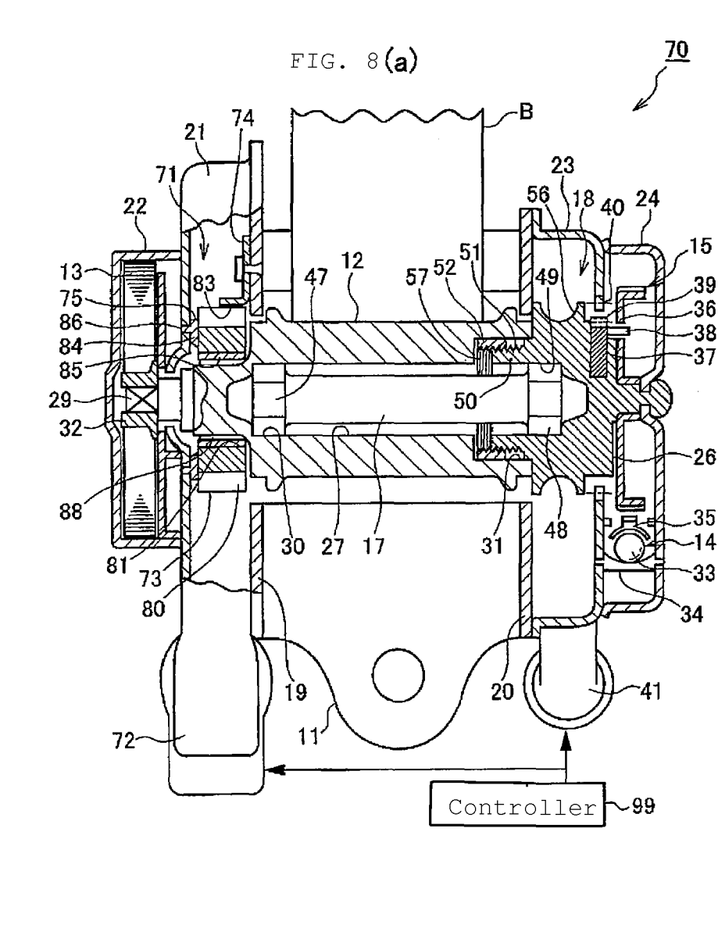

As shown in FIG. 8, when a shock signal is generated by the control circuit 99 during a vehicle collision or the like, a current for activating ignition of the gas generator 45 in the first pretensioner 71 is caused to flow. As a result, the gas generator 45 is ignited such that high-pressure gas is ejected.

The high-pressure gas acts on the pressure receiving surface 87 and then passes through the gas flow passage 76 to act on the base end portion 91 of the rack 77. As a result, the rack 77 is moved in an upward direction of FIG. 8B.

When the rack 77 starts to move in the upward direction of FIG. 8B, the tooth portions 89 thereof mesh with the tooth portions 80 of the first pinion 73, whereby the first pinion 73 is rotated in the retraction direction of the spindle 12, or in other words a clockwise rotation direction in FIG. 8B.

When the first pinion 73 rotates, the power transmission pieces 86 of the clutch plate move to the shallow groove part of the cam grooves 81 from the deep groove part as the first pinion 73 rotates, thereby becoming sandwiched between the cam grooves 81 and the serrated shaft portion 88, and accordingly, the power transmission pieces 86 break the arm portions 85 so as to rotate together with the first pinion 73 and the spindle 12. Thus, the first pinion 73 is joined integrally to the spindle 12 and therefore begins to rotate in the clockwise rotation direction of FIG. 8B. When the spindle 12 rotates, the seat belt B is retracted.

Regarding the gas ejected from the gas generator 45, a driving force applied to the rack 77 decreases gradually due to a reduction in the gas pressure caused by an increase in volume resulting from movement of the rack 77, a reduction in a temperature of the gas, gas leakage through small gaps or the like, and so on. However, residual gas in the gas flow passage 76 can be removed reliably through the discharge port 93.

In the first pretensioner 71, the rack 77 is separated from the first pinion 73 when the rack 77 stops meshing with the first pinion 73, and accordingly retraction of the seat belt B is terminated. Further, as the rack 77 is moved by the gas pressure, the notch portions 90 thereof catch on the pawl member 78, and therefore the rack 77 is held by the pawl member 78 at a movement end without returning. Hence, the retraction force generated by the rack 77 does not act on the first pinion 73 once the operation of the first pretensioner 71 is complete, and therefore a subsequent operation of the force limiter mechanism is not affected.

After the operation of the first pretensioner 71 has begun, a current for activating ignition of the gas generator 45 in the second pretensioner 18 is caused to flow from the control circuit 99, whereby the second pinion 26 begins to rotate in the retraction direction of the spindle 12 via the torsion bar 17 such that the seat belt B is retracted. Note that operations performed from activation of the second pretensioner 18 onward are similar to those of the first embodiment and therefore description of these operations has been omitted.

Hence, with the seat belt retractor 70 according to the second embodiment, similarly to the first embodiment, looseness can be eliminated from the seat belt B using the first and second pretensioners 71, 18 such that the occupant can be restrained firmly in his/her seat even when a rack-and-pinion system is applied to the first pretensioner 71.

Further, when the rack 77 moves to the movement end, movement of the rack 77 in the opposite direction to the movement direction is restricted by the pawl member 78 and biasing spring 79 constituting the restricting mechanism. As a result, the rack 77 is separated from the first pinion 73 reliably, and therefore a reliable operation can be secured in the first pretensioner 71.

Further, the pressure receiving surface 87 for receiving the gas pressure is formed in the part of the first pretensioner 71 opposing the gas generator 45, and therefore the gas pressure can be applied evenly to the base end portion 91 of the rack 77 by the pressure receiving surface 87, enabling an efficient operation in the rack 77. Moreover, the first pretensioner 71 includes the discharge port 93 for discharging the generated gas, and therefore residual gas in the gas flow passage 76 can be discharged reliably.

All other arrangements and actions are similar to those of the first embodiment.

Note that the present invention is not limited to the embodiments described above and may be subjected to appropriate modifications, amendments, and so on.

In the present invention, the activation timing of the first and second pretensioners should be set in accordance with collision conditions. Under normal collision conditions, the second pretensioner should be activated after an operation of the first pretensioner has begun. However, the two pretensioners may be activated simultaneously.

This application is based on Japanese Patent Application No. 2008-098493, filed on Apr. 4, 2008, the contents of which are incorporated herein by reference.

The invention claimed is:

1. A seat belt retractor comprising:
    a spindle around which a seat belt is wound;
    a torsion bar disposed in a cavity of said spindle, said torsion bar having a first axial end portion located opposite of a second axial end portion, the first axial end portion of said torsion bar being attached to a first axial end portion of said spindle;
    a first pretensioner that is attached to said spindle at the first axial end portion of the spindle at least during a collision, wherein during said collision, said first pretensioner causes said spindle to rotate in a retraction direction using a gas pressure from a first gas source; and
    a second pretensioner that is attached to the second axial end portion of said torsion bar at least during a collision, wherein during said collision, said second pretensioner causes said torsion bar to rotate using a gas pressure from a second gas source, whereby said rotation of said torsion bar by said second pretensioner causes rotation of said spindle via said torsion bar in said retraction direction.

2. The seat belt retractor according to claim 1, wherein said second pretensioner is configured to activate after an operation of said first pretensioner begins.

3. The seat belt retractor according to claim 2, wherein an activation interval between said first pretensioner and said second pretensioner is varied in accordance with a collision speed.

4. The seat belt retractor according to claim 1, wherein when a collision speed exceeds a first predetermined speed, said first pretensioner and said second pretensioner are activated within a first activation interval,
    when said collision speed is no higher than said first predetermined speed and no lower than a second predetermined speed, said first pretensioner and said second pretensioner are activated within a second activation interval, said second activation interval being longer than said first activation interval, and
    when said collision speed is lower than said second predetermined speed, only said first pretensioner is activated.

5. The seat belt retractor according to claim 4, wherein said second pretensioner is activated in a case where a double collision occurs at a collision speed no lower than a third predetermined speed and following activation of said first pretensioner due to a first collision occurring at a lower collision speed than said second speed.

6. The seat belt retractor according to claim 1, wherein said first pretensioner stops retracting said spindle once said seat belt has been retracted by a predetermined amount.

7. The seat belt retractor according to claim 1, wherein at least one of said first pretensioner and said second pretensioner comprises:
    a drive member that is driven in a predetermined direction by said gas pressure in order to rotate said spindle in said retraction direction; and
    a restricting mechanism that restricts movement of said drive member in an opposite direction to said predetermined direction.

8. The seat belt retractor according to claim 7, wherein said first pretensioner is constituted by a rack and a pinion, and includes a pressure receiving surface for receiving said gas pressure from a gas that is generated by igniting an explosive and a discharge port for discharging said generated gas.

9. The seat belt retractor according to claim 1, wherein said torsion bar is configured to generate a torque that is greater than a torque generated by operation of said second pretensioner.

10. The seat belt retractor according to claim 1, wherein said torsion bar has a torsional resistance greater than a maximum torque generated by operation of said second pretensioner.

11. The seat belt retractor according to claim 1, wherein the first pretensioner is directly attached to the spindle.

12. The seat belt retractor according to claim 1 wherein the second pretensioner is coupled to the spindle by way of the torsion bar and the first pretensioner is attached to the spindle not by way of the torsion bar.

* * * * *